United States Patent

Parameswar

(10) Patent No.: US 8,238,922 B2
(45) Date of Patent: Aug. 7, 2012

(54) LOCATION-BASED ADDRESS NORMALIZATION

(75) Inventor: Sriram Parameswar, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 1090 days.

(21) Appl. No.: 12/136,784

(22) Filed: Jun. 11, 2008

(65) Prior Publication Data

US 2009/0312026 A1    Dec. 17, 2009

(51) Int. Cl.
*G06F 15/16* (2006.01)
(52) U.S. Cl. .................. 455/445; 455/456.1
(58) Field of Classification Search ........... 455/404.2, 455/412.1, 414.1, 445, 456.1, 456.3, 456.6
See application file for complete search history.

(56) References Cited

U.S. PATENT DOCUMENTS

| | | | |
|---|---|---|---|
| 5,974,133 A | 10/1999 | Fleischer, III et al. | |
| 6,175,622 B1 | 1/2001 | Chiniwala et al. | |
| 6,539,089 B1 | 3/2003 | Mahajan | |
| 6,597,778 B1 | 7/2003 | Shin et al. | |
| 7,218,719 B2 | 5/2007 | Fleischer, III et al. | |
| 7,277,711 B2 | 10/2007 | Nyu | |
| 2007/0061397 A1* | 3/2007 | Gregorat et al. | 709/203 |
| 2007/0069888 A1 | 3/2007 | Parameswar | |

OTHER PUBLICATIONS

"Location-Based Normalization Rules", Microsoft Technet, Microsoft Corporation, 2008.
"VoIP Configuration", Microsoft Technet, Microsoft Corporation, 2008.
"Create Location Profiles", Microsoft Technet, Microsoft Corporation, 2008.
Morimoto, "Phone Number Normalization Made Easy", Aug. 14, 2007, Network World, Inc.

* cited by examiner

*Primary Examiner* — Sam Bhattacharya
(74) *Attorney, Agent, or Firm* — Turk IP Law, LLC (57) ABSTRACT

Architecture for normalizing phone numbers and other types of connection information for facilitating mobile communications for users outside their local service areas. When a mobile user attempts to make a connection to a destination entity while outside the user's regular service area, the current location of the user is determined by the system. A normalization rule is selected that corresponds to a local service area associated with the current location. The phone number or other type of connection data string is normalized to the standards of the local service area. The normalized data string is used to automatically complete the connection to the destination entity. In this way, communication is facilitated and simplified for mobile users while traveling abroad.

16 Claims, 11 Drawing Sheets

LOCATION-BASED ADDRESS NORMALIZATION

BACKGROUND

Number normalization is used in telecommunications networks for receiving a string of dialed numbers from a user and converting the string into a format that can be used by call processing equipment, to route communication sessions from the user to a destination entity. Number normalization is typically used in conjunction with a conventional numbering scheme, such as E.164, recommended by the International Telecommunication Union Telecommunication Standardization Sector (ITU-T), which defines the international public telecommunication numbering plan used in the public switched telephone network (PSTN). The North American Numbering Plan (NANP) includes various geographically-bounded numbering plan areas, having numbers defined by a three-digit area code and a seven-digit telephone number for routing calls.

A specific example of number normalization is abbreviated dialing, in which a user can dial a shortened string of digits to connect within a particular service area. For example, for local dialing within an area code, a user can dial 555-1234 and the number is automatically normalized within the network to the NANP number of 425-555-1234. In dialing within a private corporate network, a further abbreviated number can be used (e.g., 51234) and that dialed string is normalized to 425-555-1234, even for corporate users within the network from different geographic locations outside the local numbering plan boundaries.

In mobile communications, a problem can arise when a mobile user is operating outside the user's normal operating area while traveling, since a user's location affects the normalization of the number. For example, a United States user traveling in the United Kingdom (UK) may be unable to complete calls since the local UK phone network uses different number normalization rules to format the dialed string than the rules used by the user's NANP normalized phone. This results in frustration, inconvenience, and a loss in productivity for the user and for the individuals the user needs to contact.

In addition to mobile phones, normalization can also applied be to other types of mobile devices or mobile-capable systems, such as laptop computers that use different address formats, when roaming across numbering plan boundaries. Such address formats can include URIs (uniform resource identifiers) based addresses, which include both email addresses and session initiation protocol (SIP) addresses.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, architecture is disclosed for normalizing phone numbers and other data strings when a user is communicating outside the user's local service area. A variety of normalization rules are provided for numbering plans corresponding a variety of geographic locations representing different telecommunications service areas. These normalization rules can be stored in a normalization database. When dialing a phone number or other connection address, a current location of the user's mobile device is sent to an enterprise communications server. The location is used to select a suitable normalization rule that applies for the local service area. The selected normalization rule is applied to the dialed phone number or other type data string to produce a normalized number that can be used in connecting to the destination in accordance with the local communications network. In this way, communication is facilitated for mobile users traveling outside a normal service area.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

The disclosed architecture relates to a computer-implemented communications system for normalizing phone numbers and other types of connection information that facilitate mobile communications for users outside local service areas. For example, when a mobile user attempts to make a connection to a destination entity while outside the user's regular service area, the current location of the user is determined by the system. One or more normalization rules can be selected that correspond to a local service area associated with the current location. The phone number or other type of connection data string is normalized to the standards of the local service area. The normalized data string is used to automatically complete the connection to the destination entity. In this way, communication is facilitated and simplified for mobile users while traveling abroad or outside the regular service area.

Reference is now made to the drawings, wherein like reference numerals are used to refer to like elements throughout. In the following description, for purposes of explanation, numerous specific details are set forth in order to provide a thorough understanding thereof. It can be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
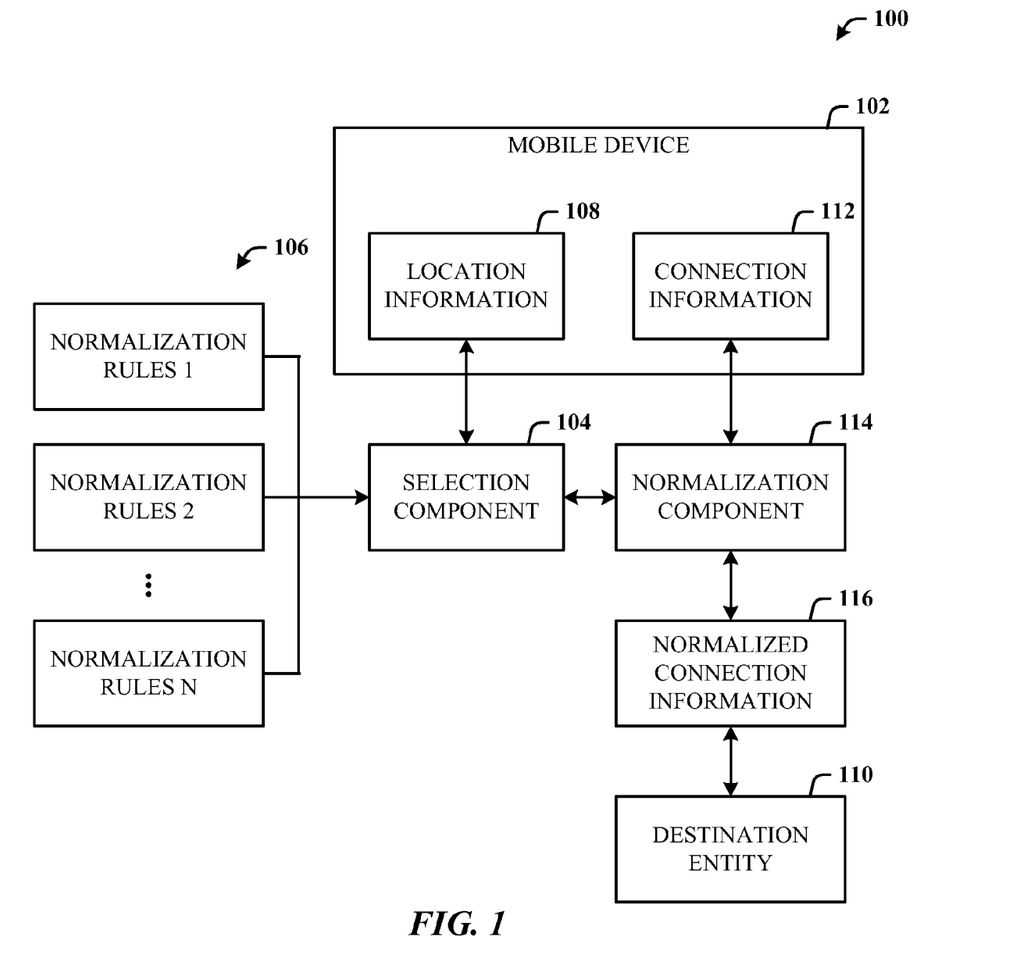
FIG. 1 illustrates a computer-implemented communications system for normalizing a connection for a mobile device.

FIG. 1 illustrates a computer-implemented communications system 100 for normalizing a connection for a mobile device 102. The system 100 is especially intended to be a telecommunications system for communicating with a mobile handset (e.g., a cellular phone). However, it can be appreciated that the system 100 can also be used with other types of mobile communications systems for transmitting and receiving voice communications, such as a suitably equipped laptop computer or personal digital assistant (PDA).

As illustrated in FIG. 1, the system 100 includes a selection component 104 for selecting normalization rules 106 based on location information 108 of the mobile device 102. The mobile device 102 initiates a connection to a destination entity 110 using connection information 112. A normalization component 114 is provided for normalizing the connection information 112 based on the location information 108. Automatic completion of the connection to the destination entity 110 is facilitated using the normalized connection information 116, as will be discussed in greater detail hereinbelow.

In an exemplary implementation, a mobile device 102 of a United States (US) (or North American) mobile user traveling in the United Kingdom (UK) operates with standard US normalization for connection information 112 (e.g., a dialed 7-digit phone number string). US normalization automatically places at the beginning of the connection information 112 a "1" for the US country code and a 3-digit area code. However, in dialing a UK number, the system 100 applies the "44" country code and a suitable geographic area code to the dialed number, based the current location of the mobile device 102.

Figure 2:
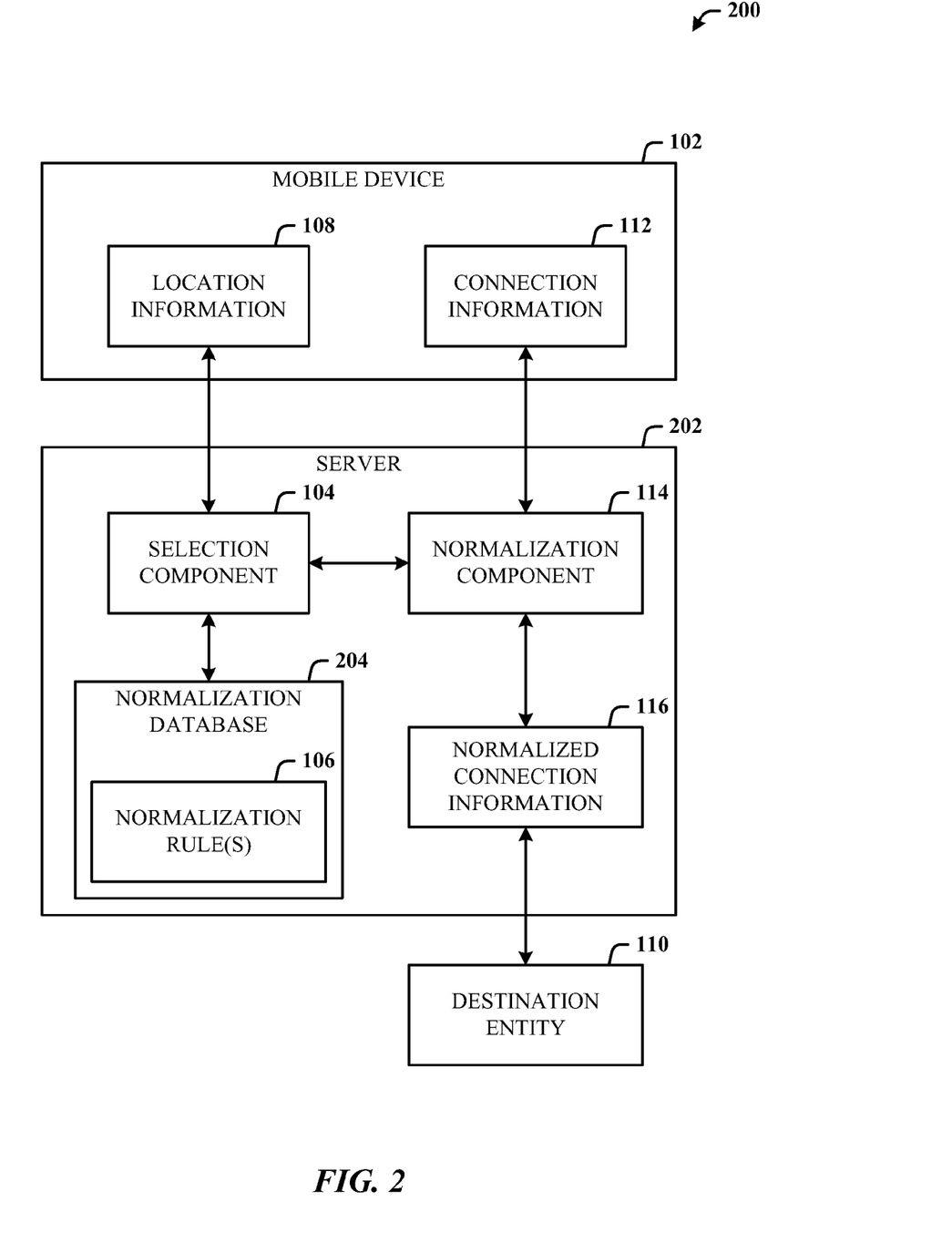
FIG. 2 illustrates an alternative embodiment of a computer-implemented system for communications having normalization performed on an enterprise communications server.

FIG. 2 illustrates an alternative embodiment of a system 200 for communications having normalization performed on an enterprise communications server 202. The selection component 104 is part of the enterprise communications server 202. A normalization database 204 is provided for retaining the normalization rules 106. In this way, the selection component 104 can query the normalization database 204 upon receipt of the location information 108 from the mobile device 102, to find the normalization rule(s) that correspond to the service area of the current location of the mobile device 102.

As also illustrated in FIG. 2, the normalization database 204 and the normalization component 114 are also part of the enterprise communications server 202. In this way, the normalization of the connection information 112 to produce the normalized connection information 116 is performed by the server 202, remotely from the mobile device 102. Additionally, the completion of the connection to the destination entity 110 is performed by the server 202, remotely from the mobile device 102.

Figure 3:
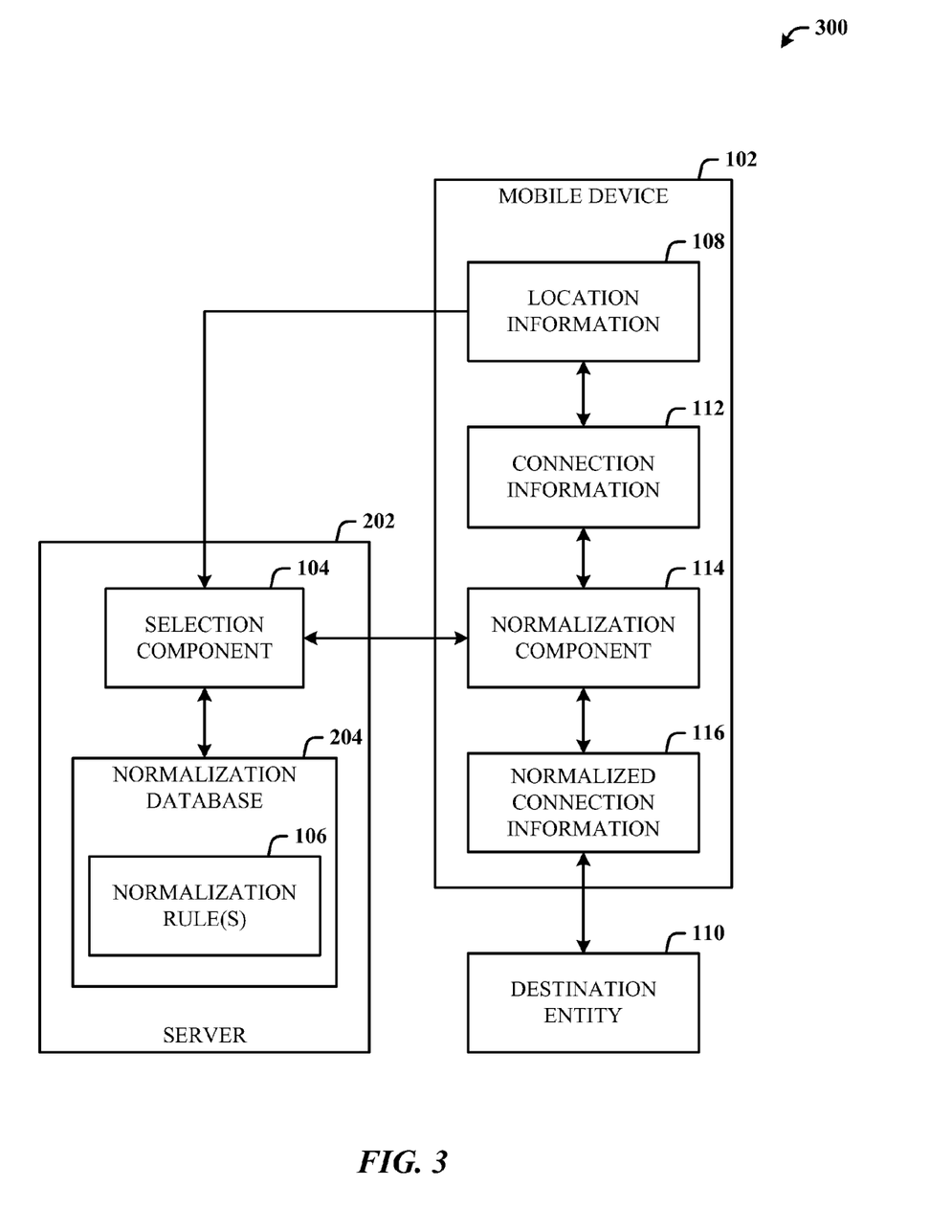
FIG. 3 illustrates a further alternative embodiment of a computer-implemented system for communications having normalization performed on a mobile device.

FIG. 3 illustrates an alternative embodiment of a system 300 for communications having normalization performed on the mobile device 102. The selection component 104 and the normalization database 204 are part of the enterprise communications server 202. However, in this particular embodiment, the normalization component 114 is part of the mobile device 102. In this way, the normalization of the connection information 112 to produce the normalized connection information 116 is performed by the mobile device 102.

In order to complete the connection to the destination entity 110, the mobile device 102 sends the normalized connection information 116 (e.g., the phone number string normalized to the local rules) to the local cellular service. The connection to the telephone network is then performed in the conventional manner via a cellular mobile switching center. In this way, the remote entity from which the normalization rules 106 were downloaded need not be the same entity that connects the communication session.

It is to be appreciated that the connection information 112 and the normalized connection information 116 can be a phone number. Based upon the original location and the current location of a mobile device 102, the connection information 112 can be normalized using one of a North American numbering plan (NANP), a national numbering plan (NNP), a private numbering plan, a mobile country code (MCC), or a mobile number portability (MNP) (allows mobile users to retain existing cell phone numbers when changing mobile operators).

Alternatively, the connection information 112 and the normalized connection information 116 can be any suitable character string for use with other types of mobile devices 102 besides cellular phones, such as a mobile-communications-equipped laptop computer or PDA or the like. For such mobile devices 102, the connection information 112 can include an Internet protocol (IP) address, a uniform resource identifier (URI), or a session initiation protocol (SIP) address.

The selection component 104 can use a number of different types of location information 108 (e.g., geographical) to ascertain the suitable normalization rules 106. For example, location coordinates can be retrieved from a geographical location technology such as global positioning system (GPS) of the type commonly located on board mobile devices 102 such as cellular phones. These GPS coordinates can be mapped to numbering plan boundaries to derive a suitable normalization rule(s) 106.

Alternatively, the location information 108 can be derived from the wireless communications carrier signal. When the mobile device 102 logs on to a mobile network, the network sends an updated location area identifier (LAI) to the mobile device 102, the LAI can include an MCC, optionally, a mobile network code (MNC), and a location area code. The normalization database 204 can cross-reference this information to a local numbering plan to derive the numbering plan boundaries.

Some networks operate with an IP multimedia subsystem (IMS). Communications on these types of networks include a P-Visited-Network-ID header that is inserted by a first hop server in the visited network. This information can also be used to derive location of the mobile device 102 based on the location of the first hop server.

In embodiments where the mobile device 102 is a laptop computer, a location country can be determined from an IP address of a connected server. An outside network such as the enterprise communications server 202 will observe the country in which the connected server is located, and thereby determine location of the mobile device 102. The mobile device 102 can also detect signals from WiFi (wireless fidelity) networks in the vicinity and derive a geographical location from those networks.

Figure 4:
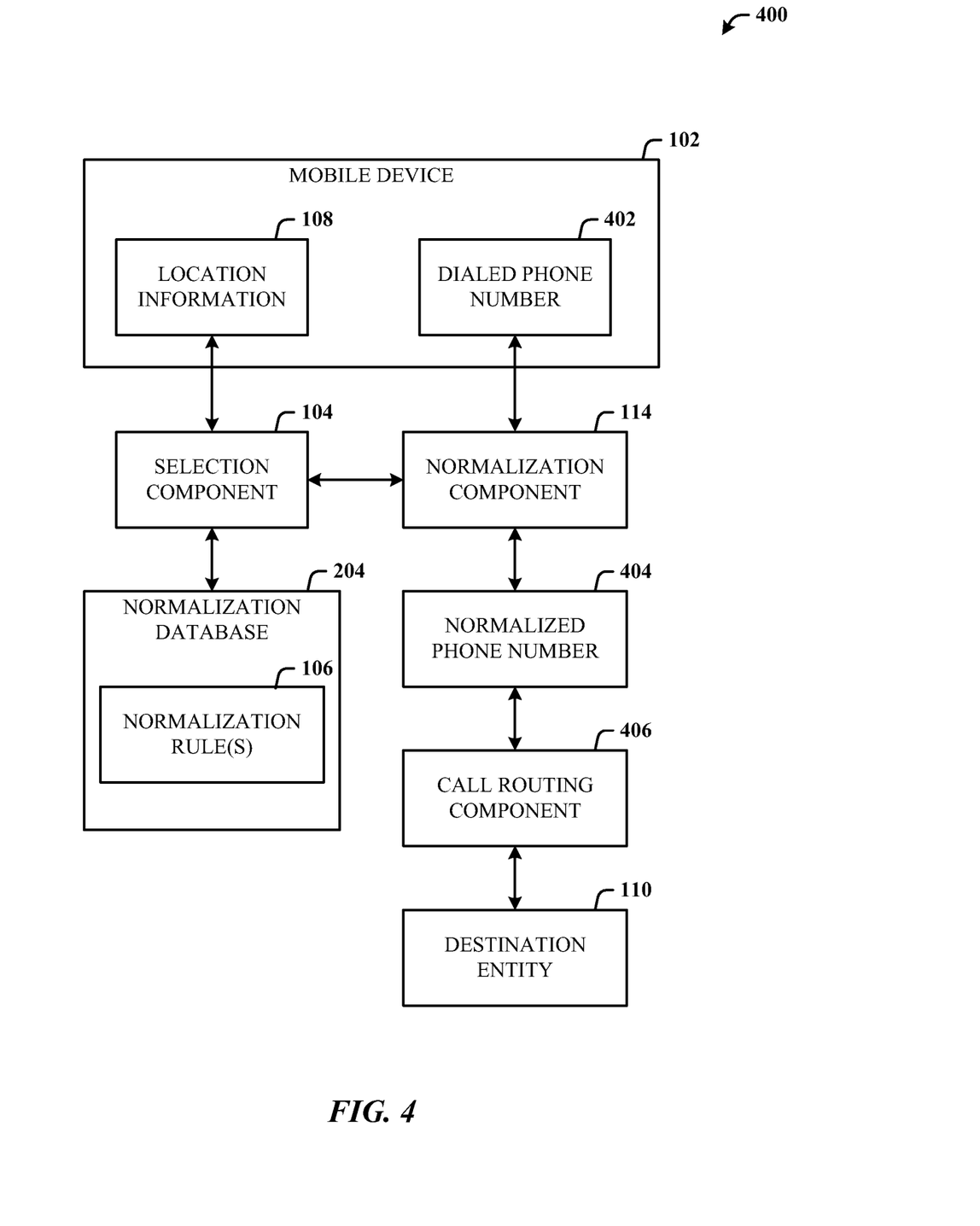
FIG. 4 illustrates an additional alternative embodiment of a computer-implemented system for telephonic communications.

FIG. 4 illustrates an additional alternative embodiment of a computer-implemented system for telephonic communications. The normalization database 204 is used for storing the plurality of normalization rules 106 for numbering plans associated with the respective plurality of locations. The selection component 104 selects the normalization rule(s) 106 corresponding to the location information 108 received from the mobile device 102. The normalization component 114 applies the selected normalization rule(s) 106 to a dialed phone number 402 received from the mobile device 102, to produce a normalized phone number 404. A call routing component 406 is provided for receiving the normalized phone number 404 and connecting a call from the mobile device 102 to the destination entity 110 associated with the dialed phone number 402.

Figure 5:
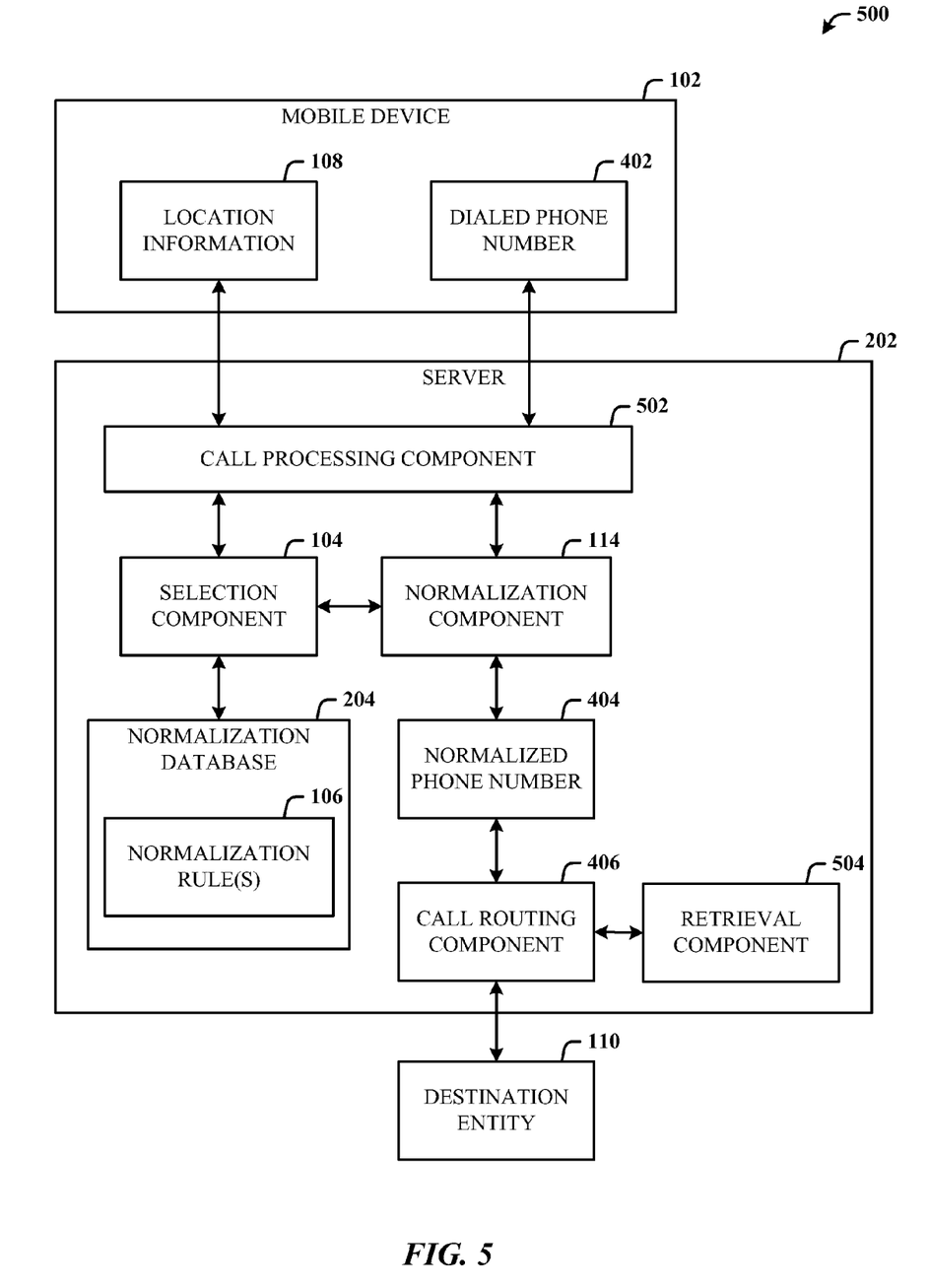
FIG. 5 illustrates another alternative embodiment of a computer-implemented system for telephonic communications having normalization performed on an enterprise communications server.

FIG. 5 illustrates another alternative embodiment of a system 500 for telephonic communications having normalization performed on an enterprise communications server. In FIG. 5, the normalization database 204, the selection component 104, the normalization component 114, and the call routing component 406 are part of the enterprise communications server 202. The normalization of the dialed phone number 402 and the connecting of the call are performed by the enterprise communications server 202 remotely from the mobile device 102.

As also illustrated in FIG. 5, a call processing component 502 is provided for receiving the location information 108 through a data channel from the mobile device 102. The data channel is used in suitably equipped cellular phones for sending and receiving emails and browsing the Internet. The data channel can also be used in an exemplary embodiment, as will be described in detail hereinbelow. Here, the call processing component 502 is part of the enterprise communications server 202.

The server 202 can also include a retrieval component 504 for storing and retrieving the selected normalization rule(s) 106 for reuse with subsequent phone calls while the mobile device 102 remains within a corresponding location. The retrieval component 504 cooperates with the call processing component 502 and can include a memory for storage of the appropriate numbering plan. In this way, the process of normalization need not be reapplied repeatedly with each call, thereby increasing speed and efficiency for the mobile user.

Figure 6:
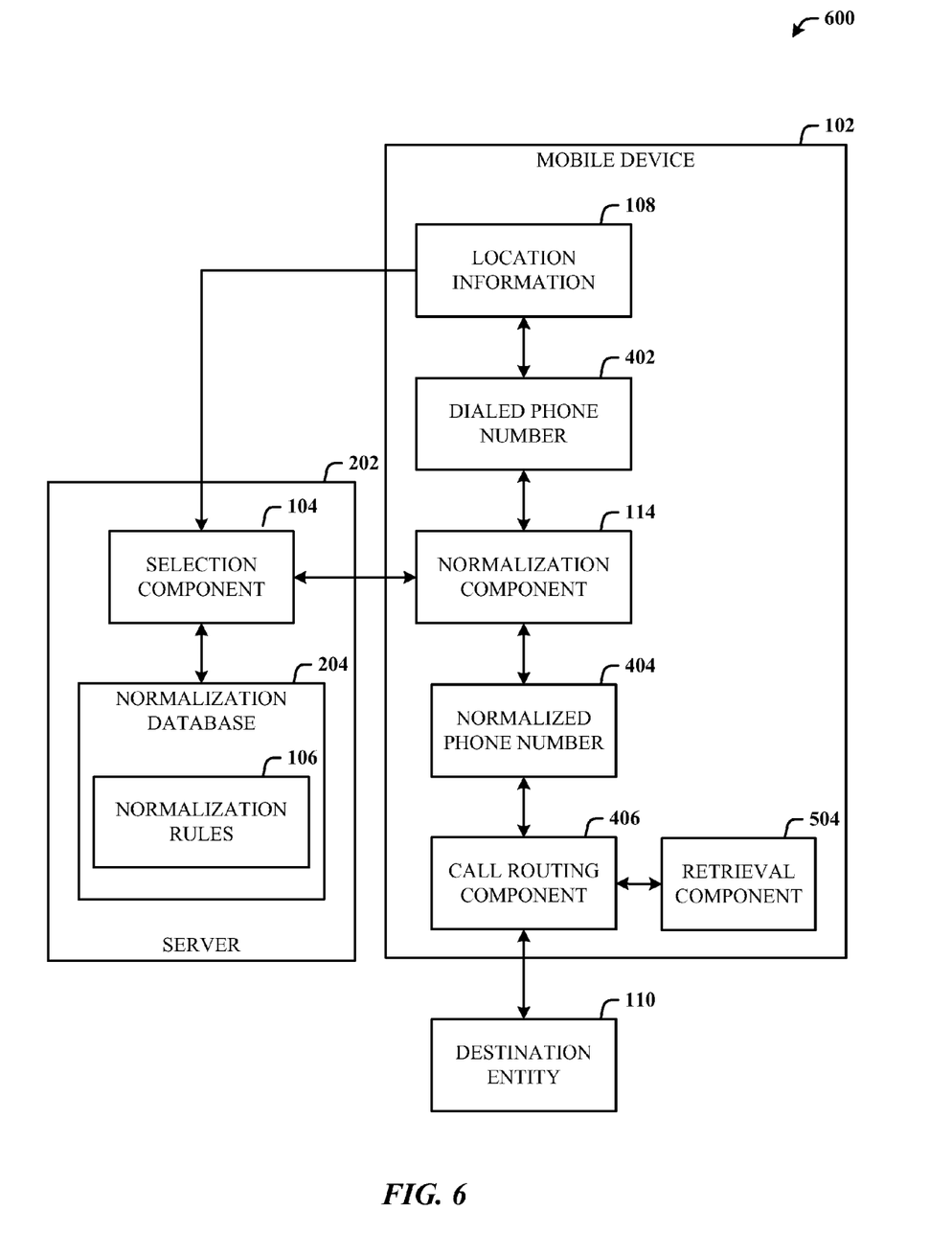
FIG. 6 illustrates a still further alternative embodiment of a computer-implemented system for telephonic communications having normalization performed on a mobile device.

FIG. 6 illustrates an alternative embodiment of a system 600 for telephonic communications having normalization performed on the mobile device 102. In the system 600, the normalization component 114 and call routing component 406 are part of the mobile device 102. In this way, the normalization of the dialed phone number 402 and the connecting of the call are performed within the mobile device 102. Although not shown, the retrieval component 504 can also be included within the mobile device 102 for quick retrieval of the selected normalization rule(s) 106 for the current geographical location. As illustrated, the normalization database 204 and the selection component 104 are part of the enterprise communications server 202.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts can, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology can be required for a novel implementation.

Figure 7:
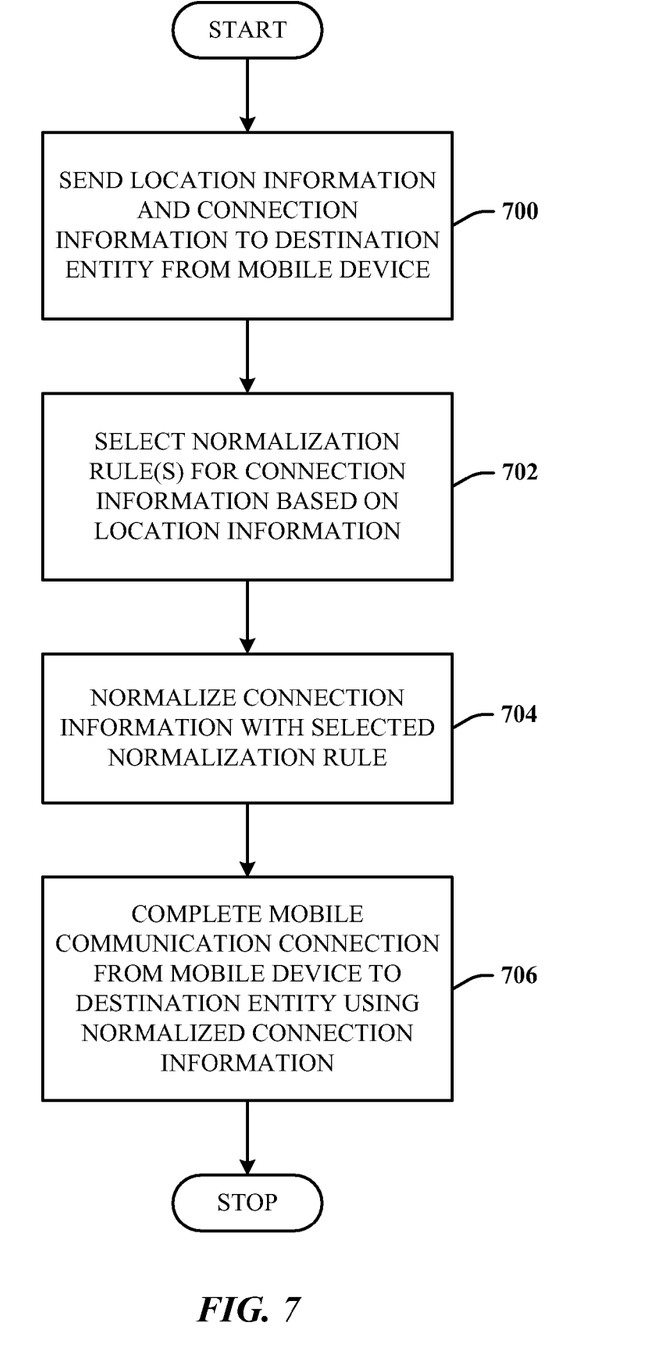
FIG. 7 illustrates an exemplary computer-implemented communications method.

FIG. 7 illustrates a computer-implemented method of mobile communications. At 700, location information is sent to a destination entity from a mobile device. In an alternative embodiment, connection information can be sent along with the location information. At 702, one or more normalization rule(s) are selected for the connection information based on the location information. At 704, the connection information is normalized based on the selected normalization rule. At 706, a mobile communications connection from the mobile device to the destination entity is completed using the normalized connection information.

It is to be appreciated that the selection of the normalization rule(s) at 702 can be performed on an enterprise communications server remotely located from the mobile device. The normalization (at 704) and the completion of the mobile communication connection (at 706) can be performed remotely from the mobile device (e.g., from the enterprise communications server). Alternatively, the normalization (at 704) and the completion of the mobile communication connection (at 706) can be performed within the mobile device.

The completion of the mobile communication connection (at 706) can be performed in the following manner. A call to the destination entity is dialed from an enterprise communications server. Another call is dialed back to the mobile device from the enterprise communications server. The calls are connected together by the enterprise communications server, so that a seamless connection is observed by the mobile user.

In one exemplary embodiment, the connection information used in the method of FIG. 7 can be a phone number particularly if used by a cellular phone or other suitable device. Depending on the locations of the mobile user and the destination entity, the normalizing can be performed using one or more of a North American numbering plan, national numbering plan, private numbering plan, mobile country code, or mobile number portability. In another exemplary embodiment in which a portable computing device such as a laptop computer or the like is used, the connection information can include one or more of an IP address, a URI, or a SIP address.

Figure 8:
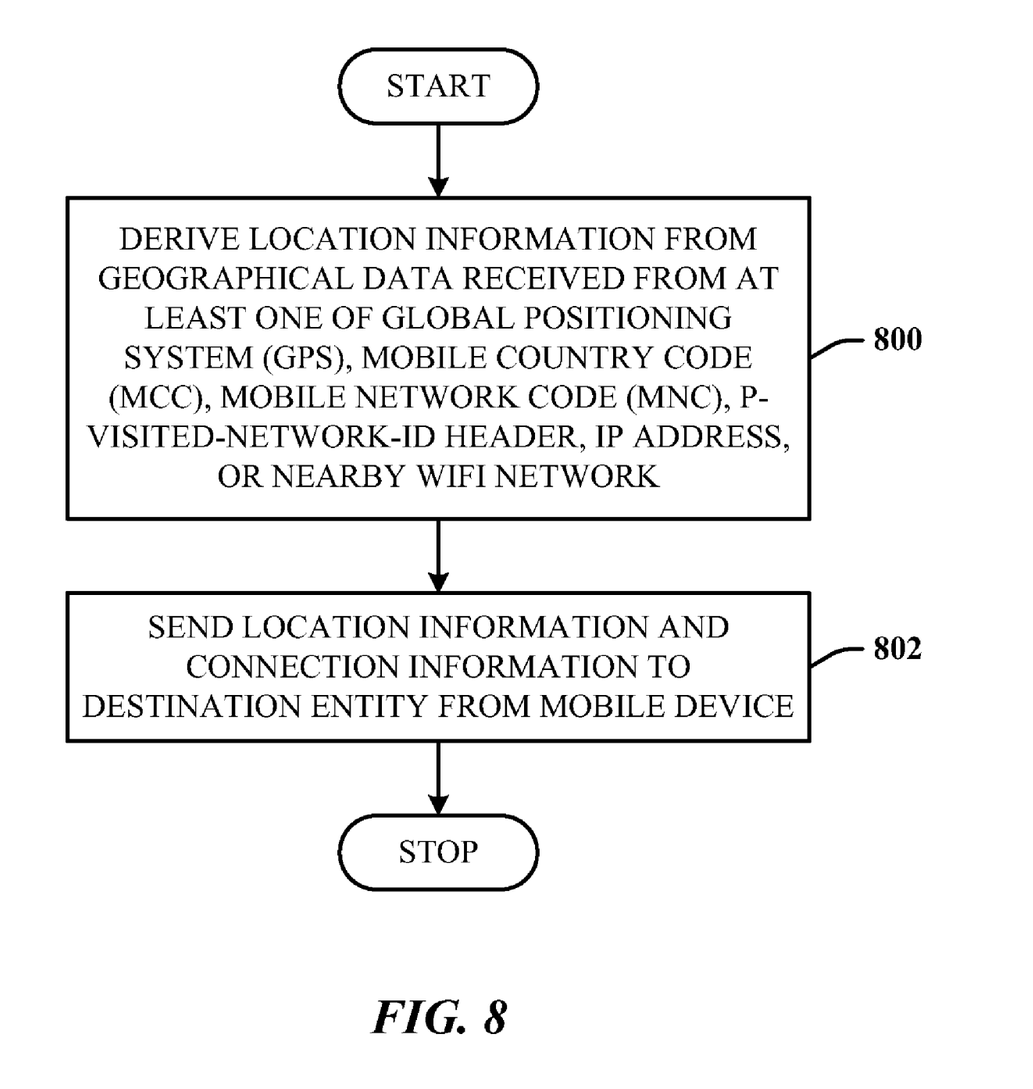
FIG. 8 illustrates further exemplary aspects of a location-determining operation in a computer-implemented communications method.

FIG. 8 illustrates further exemplary aspects of a location-determining operation in a communications method. At 800, the location information can be derived from geographical data received from one or more of global positioning system, a mobile country code, a mobile network code, a location area, a P-Visited-Network-ID header, an IP Address, or a WiFi network. As illustrated, this can be performed as a preliminary operation prior to initially sending the location information and connection information to the destination entity from the mobile device, as indicated at 802.

The aforementioned method can be implemented in the following manner. When a call is initiated, the connection information and location information are sent to an enterprise communications server over a data channel used by a cellular phone to send and receive email and web pages. The enterprise communications server derives the user's location and assigns a suitable normalization rule for the connection information. In a server-based embodiment, the enterprise communications server calls the user's mobile device (e.g., a cellular phone) over the regular phone channel. However, a mobile application programming interface (API) suppresses the ringing and thereby simulates the appearance of an outgoing call. The enterprise communications server initiates a call to the destination using the normalized connection information. The calls are thus bridged together internally, to provide a seamless connection.

The aforementioned implementation facilitates payment schemes used in various international cellular networks. For example, outside of the United States, a "caller party pays" program is typically used where the caller pays for the call. However, in the US, both the caller and the callee pay based on connection minutes. Since the enterprise communications server is the "caller," the call is less expensive while operating under a "caller party pays" program.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" can be used herein to mean serving as an example, instance, or illustration. Any aspect or design described herein as "exemplary" is not necessarily to be construed as preferred or advantageous over other aspects or designs.

Figure 9:
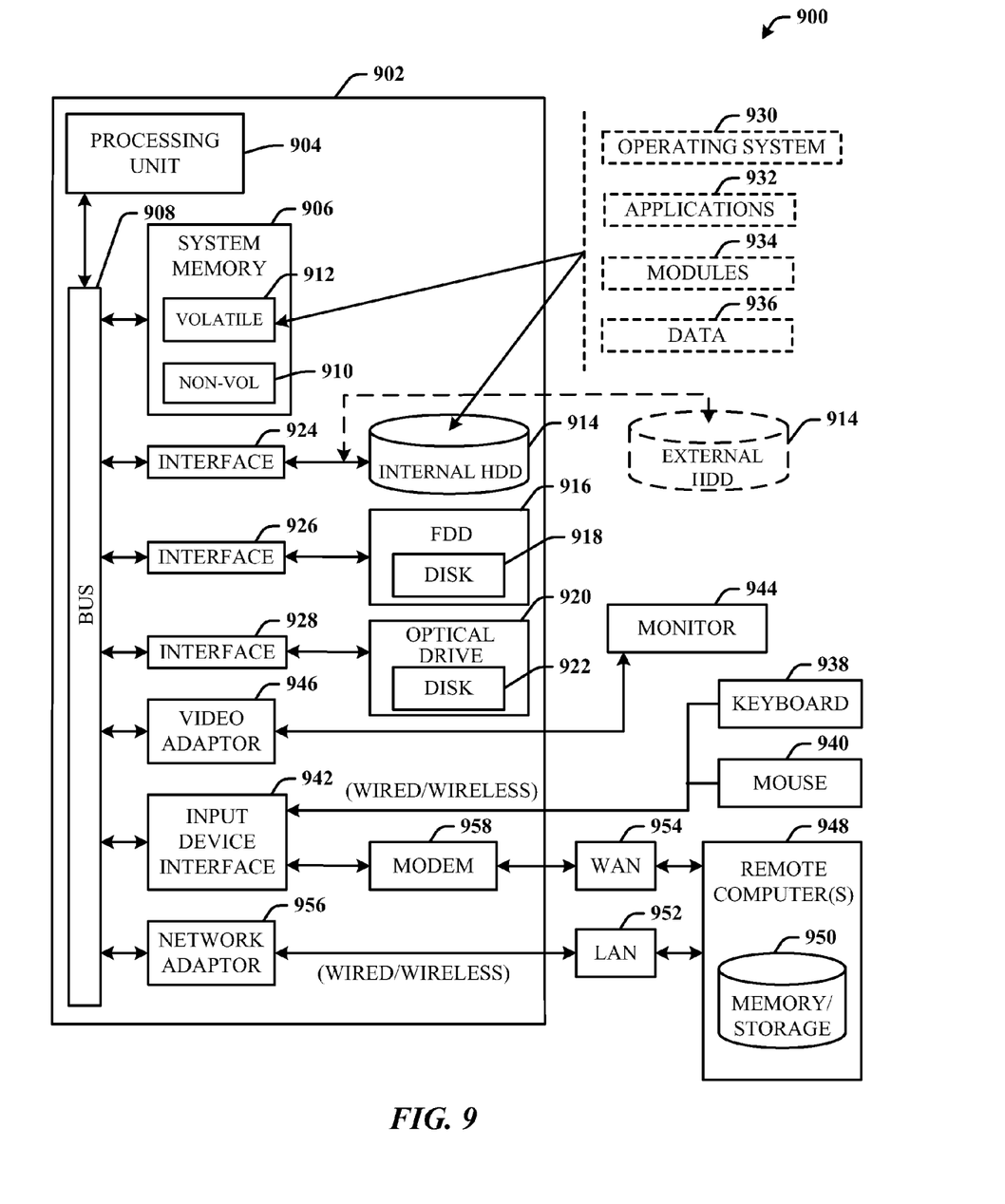
FIG. 9 illustrates a block diagram of a computing system operable to execute communications in accordance with the disclosed architecture.

Referring now to FIG. 9, there is illustrated a block diagram of a computing system 900 operable to execute the computer-implemented communications system 100 in accordance with the disclosed architecture. In order to provide additional context for various aspects thereof, FIG. 9 and the following discussion are intended to provide a brief, general description of a suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902 having a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 can include non-volatile memory (NON-VOL) 910 and/or volatile memory 912 (e.g., random access memory (RAM)). A basic input/output system (BIOS) can be stored in the non-volatile memory 910 (e.g., ROM, EPROM, EEPROM, etc.), which BIOS are the basic routines that help to transfer information between elements within the computer 902, such as during start-up. The volatile memory 912 can also include a high-speed RAM such as static RAM for caching data.

The computer 902 further includes an internal hard disk drive (HDD) 914 (e.g., EIDE, SATA), which internal HDD 914 can also be configured for external use in a suitable chassis, a magnetic floppy disk drive (FDD) 916, (e.g., to read from or write to a removable diskette 918) and an optical disk drive 920, (e.g., reading a CD-ROM disk 922 or, to read from or write to other high capacity optical media such as a DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette (e.g., FDD), and a removable optical media such as a CD or DVD, it can be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing novel methods of the disclosed architecture.

A number of program modules can be stored in the drives and volatile memory 912, including an operating system 930, one or more application programs 932, other program modules 934, and program data 936. All or portions of the operating system, applications, modules, and/or data can also be cached in the volatile memory 912. It is to be appreciated that the disclosed architecture can be implemented with various commercially available operating systems or combinations of operating systems.

The aforementioned application programs 932, other program modules 934, and program data 936 can include the computer-implemented communications system 100, the mobile device 102, the selection component 104, the normalization rules 106, the location information 108, the destination entity 110, the connection information 112, the normalization component 114, and the normalized connection information 116 from FIG. 1, the computer-implemented communications system 200, the enterprise communications server 202, and the normalization database 204 from FIG. 3, and the computer-implemented communications system 300 from FIG. 3. The application programs 932, other program modules 934, and program data 936 can also include the computer-implemented communications system 400, the dialed phone number 402, the normalized phone number 404, and the call routing component 406 from FIG. 4, the computer-implemented communications system 500, the call processing component 502, and the retrieval component 504 from FIG. 5, and the computer-implemented communications system 600 from FIG. 6.

A user can enter commands and information into the computer 902 through one or more wire/wireless input devices, for example, a keyboard 938 and a pointing device, such as a mouse 940. Other input devices (not shown) can include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, etc.

A monitor 944 or other type of display device is also connected to the system bus 908 via an interface, such as a video adaptor 946. In addition to the monitor 944, a computer typically includes other peripheral output devices (not shown), such as speakers, printers, etc.

The computer 902 can operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which can connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which can also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, is connected to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 10:
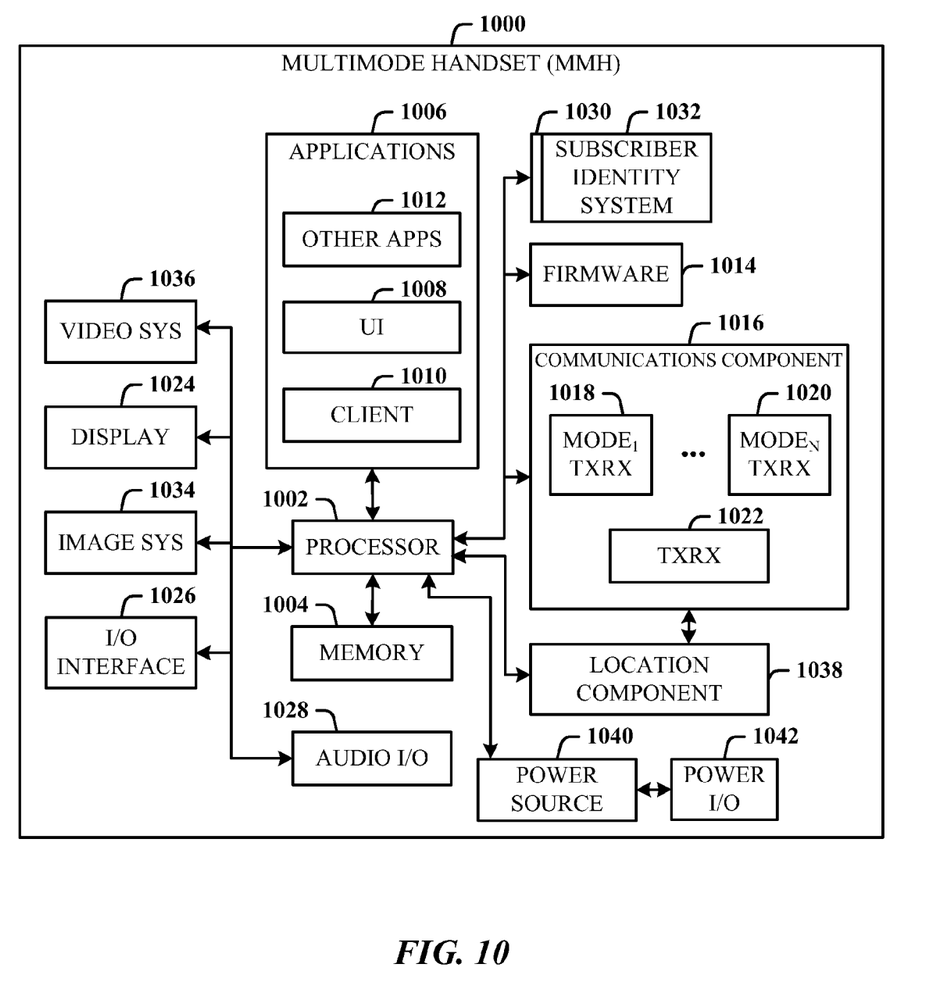
FIG. 10 illustrates an exemplary multi-mode handset used with a computer-implemented communications system.

FIG. 10 illustrates a block diagram of an exemplary multimode handset 1000 used with a computer-implemented communications system. In order to provide additional context for various aspects thereof, FIG. 10 and the following discussion are intended to provide a brief, general description of a suitable environment in which the various aspects of the novel embodiment can be implemented. While the description includes a general context of computer-executable instructions, those skilled in the art will recognize that the novel embodiment also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The handset 1000 (e.g., a cell phone) can typically include a variety of computer-readable media. Computer-readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital video disc (DVD) or other optical disk storage, magnetic tape, magnetic disk storage or other magnetic storage devices, or any other medium which can be used to store the desired information and which can be accessed by the handset systems.

The handset 1000 includes a processor 1002 for controlling and processing onboard operations and functions. A memory 1004 interfaces to the processor 1002 for the storage of data and one or more applications 1006 (e.g., a video player software, user feedback component software, etc.). The applications 1006 can also include a user interface (UI) application 1008 that operates with a client 1010 (e.g., operating system) to facilitate user interaction with handset functionality and data, for example, answering/initiating calls, entering/deleting data, configuring settings, address book manipulation, multimode interaction, etc. The applications 1006 can include other applications 1012 that came installed with the handset 1000 and/or can be installed as add-ons or plug-ins to the client 1010 and/or UI 1008, for example, or for other purposes (e.g., processor, firmware, etc.).

Additionally, the applications 1006 can include the computer-implemented communications system 100, the mobile device 102, the selection component 104, the normalization rules 106, the location information 108, the destination entity 110, the connection information 112, the normalization component 114, and the normalized connection information 116 from FIG. 1, the computer-implemented communications system 200, the enterprise communications server 202, and the normalization database 204 from FIG. 3, and the computer-implemented communications system 300 from FIG. 3. The applications 1006 can also include the computer-implemented communications system 400, the dialed phone number 402, the normalized phone number 404, and the call routing component 406 from FIG. 4, the computer-implemented communications system 500, the call processing component 502, and the retrieval component 504 from FIG. 5, and the computer-implemented communications system 600 from FIG. 6.

The other applications 1012 can include voice recognition of predetermined voice commands that facilitate user control, call voice processing, voice recording, messaging, e-mail processing, video processing, image processing, music play, as well as subsystems or components described infra. Some of the applications 1006 can be stored in the memory 1004 and/or in a firmware 1014, and executed by the processor 1002 from either or both the memory 1004 or/and the firmware 1014. The firmware 1014 can also store code for execution in power-up initialization and control during normal operation of the handset 1000.

A communications component 1016 can interface to the processor 1002 to facilitate wired/wireless communications with external systems, for example, cellular networks, VoIP (voice-over-IP) networks, local wireless networks or personal wireless networks such as Wi-Fi, Wi-Max, and so on. Here, the communications component 1016 can also include a multimode communications subsystem for providing cellular communications via different cellular technologies. For example, a first cellular transceiver 1018 (e.g., GSM) can be one mode and an Nth transceiver 1020 can provide cellular communications via an Nth cellular network (e.g., UMTS), where N is a positive integer. The communications component 1016 can also include a transceiver 1022 for unlicensed communications (e.g., Wi-Fi, Wi-Max, Bluetooth, etc.) for corresponding communications. The communications component 1016 can also facilitate communications reception from terrestrial radio networks (e.g., broadcast), digital satellite radio networks, and Internet-based radio services networks.

The handset 1000 can process IP data traffic via the communications component 1016 to accommodate IP traffic from an IP network such as, for example, the Internet, a corporate intranet, a home broadband network, a personal area network, etc., via an ISP or broadband cable provider. Thus, VoIP traffic can be utilized by the handset 1000 and IP-based multimedia content can be received in an encoded and/or decoded format.

The handset 1000 includes a display 1024 for displaying multimedia that include text, images, video, telephony functions (e.g., a Caller ID function), setup functions, menus, etc. The display 1024 can also accommodate the presentation of multimedia content (e.g., music metadata, messages, wallpaper, graphics, etc.).

An input/output (I/O) interface 1026 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, etc.). The I/O interface 1026 can be utilized for updating and/or troubleshooting the handset 1000, for example.

Audio capabilities can be provided via an audio I/O component 1028, which can include a speaker for the output of audio signals related to, for example, indication that the user pressed the proper key or key combination to initiate the user feedback signal, call signals, music, etc. The audio I/O component 1028 also facilitates the input of audio signals via a microphone to record data and/or telephony voice data, and for inputting voice signals for telephone conversations.

The handset 1000 can include a slot interface 1030 for accommodating a subscriber identity system 1032 that can accommodate a SIM or universal SIM (USIM), and interfacing the subscriber identity system 1032 with the processor 1002. However, it is to be appreciated that the subscriber identity system 1032 can be manufactured into the handset 1000, and updated by downloading data and software thereinto.

An image capture and processing system 1034 (e.g., a camera) can be provided for decoding encoded image content. Additionally, as indicated, photos can be obtained via an associated image capture subsystem of the image system 1034. The handset 1000 can also include a video component 1036 for processing video content received and, for recording and transmitting video content.

Optionally, a geolocation component 1038 (e.g., GPS-global positioning system) facilitates receiving geolocation signals (e.g., from satellites via the communications component 1016) that define the location of the handset 1000. Alternatively, or in combination therewith, the geolocation component 1038 can facilitate triangulation processing for locating the handset 1000.

The handset 1000 also includes a power source 1040 in the form of batteries and/or an AC power subsystem, which power source 1040 can interface to an external power system or charging equipment (not shown) via a power I/O component 1042.

Figure 11:
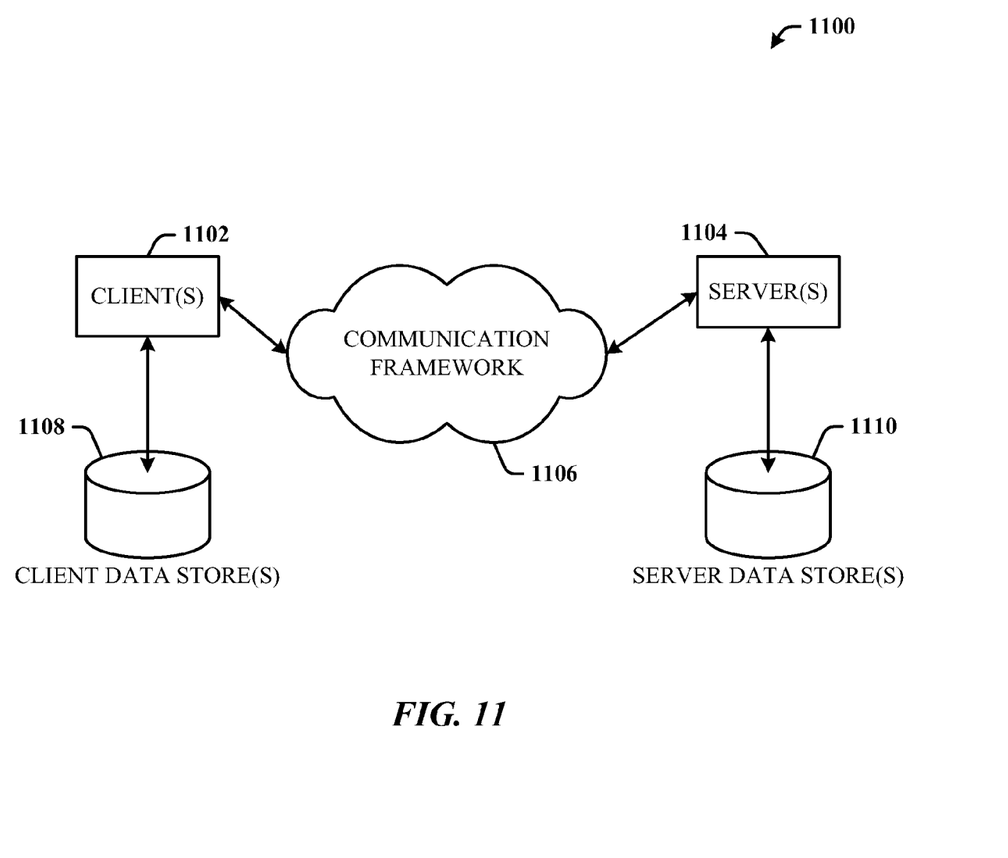
FIG. 11 illustrates an exemplary computing environment operable to execute a communications method.

Referring now to FIG. 11, there is illustrated a schematic block diagram of an exemplary computing environment 1100 that interacts with the computer-implemented communications system 100. The environment 1100 includes one or more client(s) 1102. The client(s) 1102 can be hardware and/or software (e.g., threads, processes, computing devices). The client(s) 1102 can house cookie(s) and/or associated contextual information, for example.

The environment 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet can include a cookie and/or associated contextual information, for example. The environment 1100 includes a communication framework 1106 (e.g., a global communication network such as the Internet) that can be employed to facilitate communications between the client(s) 1102 and the server(s) 1104.

Communications can be facilitated via a wire (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed architecture. It is, of course, not possible to describe every conceivable combination of components and/or methodologies, but one of ordinary skill in the art can recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented communications system, comprising:
    a selection component at a server for selecting normalization rules based on location information of a mobile device and a numbering plan boundary at the server storing the normalization rules, the mobile device initiating a connection to a destination entity using connection information;
    a location component at the mobile device adapted to:
        determine the location information of the mobile device from geographical data received from at least one from a set of: a global positioning system (GPS), a mobile country code, a mobile network code, a visited network identifier header, an Internet Protocol (IP) address, and a nearby wireless network, and
        determine the numbering plan boundary from the location information wherein the numbering plan boundary defines the selection component at the server;
    a normalization component at the mobile device for normalizing the connection information based on the location information and facilitating automatic completion of the connection to the destination entity using the normalized connection information; and
    a call routing component for receiving the normalized connection information and connecting a call from the mobile device to the destination entity associated with the connection.

2. The system of claim 1, wherein the selection component is part of an enterprise communications server.

3. The system of claim 1, further comprising a normalization database for retaining the normalization rules.

4. The system of claim 1, wherein the normalization component is part of an enterprise communications server, the normalization of the connection information and completion of the connection is performed remotely from the mobile device.

5. The system of claim 1, wherein the mobile device further includes a retrieval component for retrieval of the normalization rules from the server.

6. The system of claim 1, wherein the connection information is a phone number that is normalized using one of a North American numbering plan, a national numbering plan, a private numbering plan, a mobile country code, or a mobile number portability.

7. The system of claim 1, wherein the connection information comprises at least one of an Internet protocol (IP) address, a uniform resource identifier (URI), or a session initiation protocol (SIP) address.

8. A computer-implemented communications system, comprising:
    an enterprise server that includes:
        a normalization database for storing a plurality of normalization rules for numbering plans associated with a respective plurality of locations;
        a selection component for selecting a normalization rule corresponding to location information received from the mobile device; and
        a normalization component for applying the selected normalization rule to a dialed phone number received from the mobile device to produce a normalized phone number; and
    at least one mobile device that includes:
        a location component for
            determining the location information of the mobile device from geographical data received from at least one from a set of: a global positioning system (GPS), a mobile country code, a mobile network code, a visited network identifier header, an Internet Protocol (IP) address, and a nearby wireless network, and
            determining a numbering plan boundary from the location information, wherein the numbering plan boundary defines the selection component at the enterprise server; and
        a call routing component for receiving the normalized phone number and connecting a call from the mobile device to a destination entity associated with the dialed phone number.

9. The system of claim 8, wherein the at least one mobile device further comprises a retrieval component for storing and retrieving the selected normalization rule for reuse with subsequent phone calls while the mobile device remains within a corresponding location.

10. The system of claim 8, wherein the enterprise server further comprises a call processing component for receiving the location information through a data channel from the mobile device.

11. A computer-implemented method of mobile communications, comprising:
    retrieving location information for a mobile device from a geolocation component of the mobile device acquiring geographical location data from a global positioning system;
    determining a numbering plan boundary from the location information at the mobile device;
    selecting a normalization rule for connection information based on the location information and the numbering plan boundary at an enterprise communication server storing a plurality of normalization rules;

normalizing the connection information based on the selected normalization rule at the mobile device; and
completing a mobile communications connection from the mobile device to the destination entity using the normalized connection information.

12. The method of claim 11, further comprising performing selection of the normalization rule on an enterprise communications server remotely located from the mobile device.

13. The method of claim 11, further comprising performing completion of the mobile communications connection remotely from the mobile device.

14. The method of claim 11, wherein performing completion of the mobile communications connection comprises dialing a call to the destination entity from an enterprise communications server, dialing a call back to the mobile device from the enterprise communications server, and connecting the calls together.

15. The method of claim 11, wherein the connection information is a phone number and the normalizing is performed using one of a North American numbering plan, national numbering plan, private numbering plan, mobile country code, or mobile number portability.

16. The method of claim 11, wherein the connection information comprises at least one of an IP address, a URI, or a SIP address.

* * * * *